(12) United States Patent
Itagaki

(10) Patent No.: US 11,879,419 B2
(45) Date of Patent: Jan. 23, 2024

(54) ENGINE INTAKE STRUCTURE FOR VEHICLES

(71) Applicant: HONDA MOTOR CO., LTD., Tokyo (JP)

(72) Inventor: Keisuke Itagaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 17/776,675

(22) PCT Filed: Nov. 5, 2020

(86) PCT No.: PCT/JP2020/041375
§ 371 (c)(1),
(2) Date: May 13, 2022

(87) PCT Pub. No.: WO2021/100478
PCT Pub. Date: May 27, 2021

(65) Prior Publication Data
US 2022/0397083 A1 Dec. 15, 2022

(30) Foreign Application Priority Data
Nov. 20, 2019 (JP) ................................ 2019-209783

(51) Int. Cl.
*F02M 35/16* (2006.01)
*F02M 35/12* (2006.01)

(52) U.S. Cl.
CPC ...... *F02M 35/161* (2013.01); *F02M 35/1266* (2013.01)

(58) Field of Classification Search
CPC .......... B60K 13/02; B60K 1/00; B60K 11/00; F02M 35/10; F02M 35/12;
(Continued)

(56) References Cited

U.S. PATENT DOCUMENTS 6,199,657 B1 * 3/2001 Misawa ............. F02M 35/1227
181/224
6,719,078 B2 * 4/2004 Nakamura ....... F02M 35/10013
454/906
(Continued)

FOREIGN PATENT DOCUMENTS

CN 206319974 U 7/2017
CN 109083776 A 12/2018
(Continued)

OTHER PUBLICATIONS

International Search Report for Patent Application PCT/JP2020/041375 dated Dec. 22, 2020; 6 pp.
China Office Action for patent application CN 202080078215.9 dated Apr. 27, 2023; 11 pp.

*Primary Examiner* — Edgardo San Martin
(74) *Attorney, Agent, or Firm* — Armstrong Teasdale LLP

(57) ABSTRACT

An engine intake structure comprises an intake passage member 18 which defines an intake passage 36 for supplying air to an internal combustion engine 12, and which also defines a resonator chamber 40 in communication with the intake passage 36; and an in-vehicle device 14 located in an engine room 10 of a vehicle and having a preset reference temperature for temperature control, the intake passage member 18 being located above and adjacent to the in-vehicle device 14. The intake passage 36 extends above the in-vehicle device 14 so as to at least partially overlap the resonator chamber 40 as viewed in a vertical direction, thereby forming a two-layer structure, which makes the in-vehicle device 14 less affected by ambient temperature in the upper part of the engine room 10.

4 Claims, 5 Drawing Sheets

(58) Field of Classification Search
CPC ........... F02M 35/1266; F02M 35/1261; F02M 35/1255; F02M 35/161; F02M 35/16
See application file for complete search history.

(56) References Cited

U.S. PATENT DOCUMENTS

| | | | |
|---|---|---|---|
| 6,978,755 B2 * | 12/2005 | Yamamoto | ....... F02M 35/10065 |
| | | | 123/184.53 |
| 7,967,106 B2 * | 6/2011 | Ross | ................... F02M 35/1261 |
| | | | 123/184.55 |
| 10,655,577 B2 * | 5/2020 | Itagaki | ............... H05K 7/20854 |
| 2004/0069563 A1 | 4/2004 | Zirkelbach | |
| 2006/0027204 A1 | 2/2006 | Vogt et al. | |
| 2007/0012276 A1 | 1/2007 | Ohara | |
| 2009/0242323 A1 * | 10/2009 | Densmore | .......... F02M 35/1255 |
| | | | 181/229 |
| 2018/0363599 A1 | 12/2018 | Itagaki | |
| 2018/0363602 A1 | 12/2018 | Itagaki | |

FOREIGN PATENT DOCUMENTS

| | | | | |
|---|---|---|---|---|
| CN | 109083777 A | | 12/2018 | |
| CN | 114687897 A | * | 7/2022 | |
| EP | 1394401 A2 | | 3/2004 | |
| JP | H06159174 A | | 6/1994 | |
| JP | 2002070676 A | | 3/2002 | |
| JP | 2004092615 A | | 3/2004 | |
| JP | 2004182220 A | | 7/2004 | |
| JP | 2006046327 A | | 2/2006 | |
| JP | 2006144703 A | | 6/2006 | |
| JP | 2006152811 A | | 6/2006 | |
| JP | 2017082712 A | * | 5/2017 | ......... F02M 35/1266 |
| JP | 2018193947 A | | 12/2018 | |
| JP | 2019002284 A | | 1/2019 | |
| JP | 2019002284 A | * | 1/2019 | |
| JP | 2019002328 A | | 1/2019 | |
| JP | 6933505 B2 | * | 9/2021 | |
| KR | 20200033410 A | * | 3/2020 | |

* cited by examiner

Fig.4
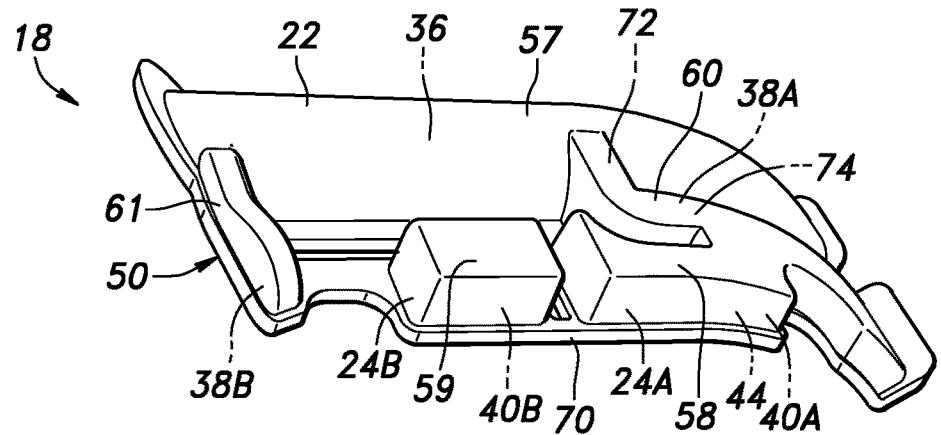
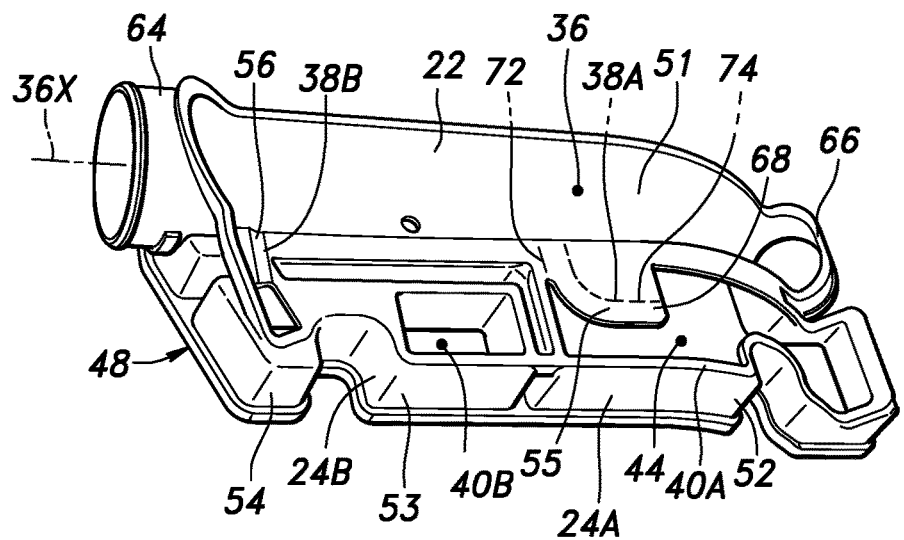
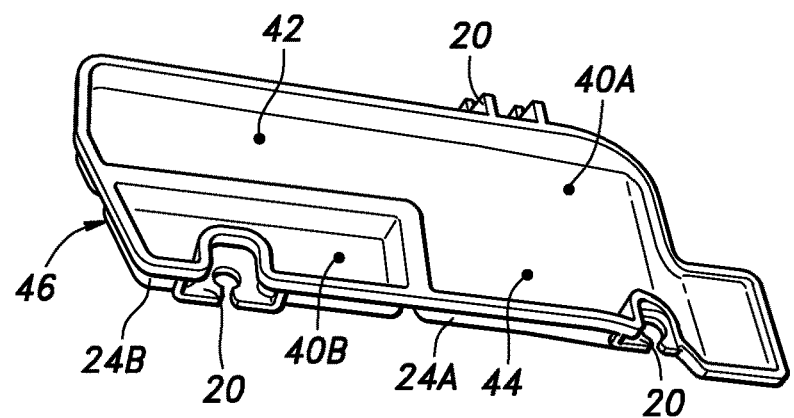

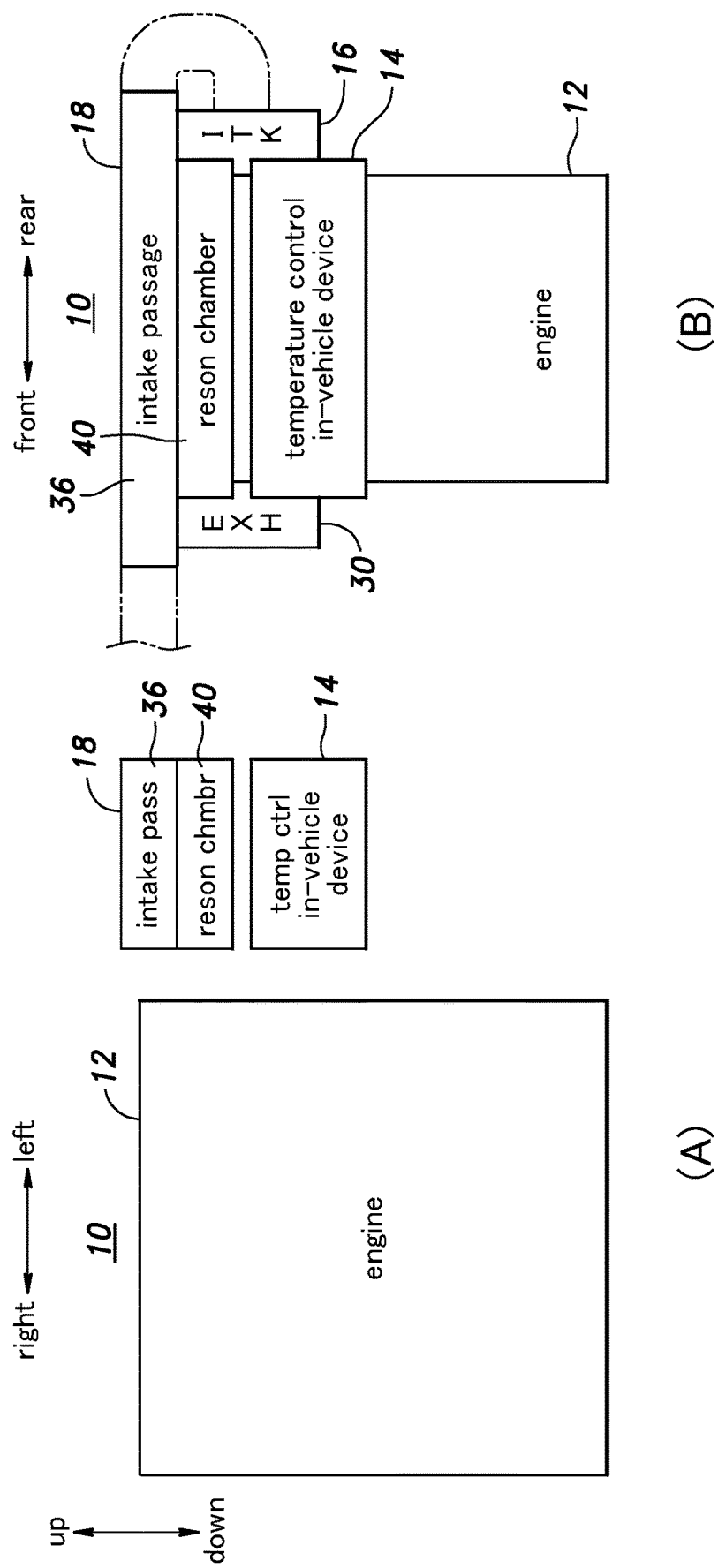

ENGINE INTAKE STRUCTURE FOR VEHICLES

CROSS-REFERENCE TO RELATED APPLICATIONS

This application is a U.S. National Phase Application of PCT/JP2020/041375 filed Nov. 5, 2020, which claims the benefit of Japanese Patent Application No. 2019-209783 filed Nov. 20, 2019. The contents of these applications are hereby expressly incorporated by reference in their entirety.

TECHNICAL FIELD

The present disclosure relates to an engine intake structure for an internal combustion engine of a vehicle.

BACKGROUND ART

A known configuration of a hybrid vehicle includes an inverter cooling system for cooling an inverter that drives a motor generator, as well as an engine cooling system for cooling an internal combustion engine (See Patent Document 1, for example). Such a hybrid vehicle is required to be configured such that the temperature of cooling water in the inverter cooling system (e.g., 50° C.) is lower than that of cooling water in the engine cooling system (e.g., 100° C.). Thus, in this case, the upper limit temperature of cooling water in the inverter cooling system is preset to be lower than that of cooling water in the engine cooling system.

Some in-vehicle devices need to be cooled by a cooling system to a lower temperature than that of an internal combustion engine. Thus, the Applicant's earlier application discloses an intake structure for an internal combustion engine of a vehicle in which a cooling device for cooling an in-vehicle device(s) is also used to cool intake air (See Patent Document 2). This intake structure includes an intake passage member which defines an intake passage and a resonance chamber (which is also referred to as a resonator chamber), where the intake passage member is located above and in proximity of a PCU, an in-vehicle device to be cooled by the cooling device, to thereby prevent a rise in the temperature of the intake passage member and air flowing therethrough.

PRIOR ART DOCUMENT (S)

Patent Document(s)

Patent Document 1: JP2006-144703A
Patent Document 2: JP2019-002328A

SUMMARY OF THE INVENTION

Task to be Accomplished by the Invention

Ambient temperature in an engine room can be easily elevated to a higher temperature than that of an in-vehicle device having a preset reference temperature for temperature control. In particular, when a vehicle is stopped or the ignition is off, ambient temperature in the upper part of an engine room tends to become high. Under such a condition, in the intake structure described in Patent Document 2, the intake passage member functions as a heat shield member which prevents the rise in temperature of the in-vehicle device due to the high temperature air in the engine room. However, in Patent Document 2, since the intake passage member defines the intake passage and the resonance chamber such that the resonance chamber is located laterally to a side of the intake passage, there is a risk that the intake passage member transfers heat of high temperature air in an upper part of an engine room to the in-vehicle device, resulting in an elevated temperature of the in-vehicle device.

The present invention has been made in view of this problem of the prior art, and a primary object of the present invention is to provide an engine intake structure for vehicles, which enables an in-vehicle device to be less affected by ambient temperature in an engine room.

Means to Accomplish the Task

One aspect of the present invention provides an engine intake structure for vehicles, comprising: an intake passage member (18) which defines an intake passage (36) for supplying air to an internal combustion engine (12), and which also defines a resonator chamber (40) in communication with the intake passage; and an in-vehicle device (14) located in an engine room (10) of a vehicle, the in-vehicle device having a preset reference temperature for temperature control, wherein the intake passage member is located above and adjacent to the in-vehicle device, and wherein the intake passage extends above the in-vehicle device so as to at least partially overlap the resonator chamber as viewed in a vertical direction.

In this configuration, as the intake passage extends above the in-vehicle device so as to at least partially overlap the resonator chamber as viewed in a vertical direction, thereby forming a two-layer structure, the in-vehicle device is less affected by ambient temperature in an upper part of the engine room. As a result, it is possible to prevent the temperature of the in-vehicle device from increasing beyond the preset reference temperature.

In the above engine intake structure, preferably, the intake passage member comprises: a lower member (46) forming a bottom wall of the resonator chamber and located adjacent to the in-vehicle device; a middle member (48) including a portion (51) forming an upper wall of the resonator chamber and a bottom wall of the intake passage, the middle member being coupled to a top of the lower member; and an upper member (50) including a portion (57) forming an upper wall of the intake passage, the upper member being coupled to a top of the middle member.

In this configuration, the intake passage member has a three-piece structure consisting primarily of the lower member, the middle member and the upper member. Thus, a part of the resonator chamber where the intake passage overlaps the resonator chamber as viewed in the vertical direction, can be easily made to have any desired shape by properly designing the middle member and the lower member, which increases degrees of freedom in the design of the resonator.

In the above engine intake structure, preferably, the intake passage extends along one side of the intake passage member, and wherein the resonator chamber extends along and partially adjacent to the intake passage so as to partially circumferentially surround the intake passage from a side part to a bottom part of the intake passage as viewed in a cross section thereof.

In this configuration, since the resonator chamber extends over both a side part and the bottom part of the intake passage, the volume of the resonator chamber can be easily expanded by increasing one of the width and height of the intake passage member.

In the above engine intake structure, preferably, the in-vehicle device and the intake passage member are located laterally to (on the left side of) the internal combustion engine, and wherein the intake passage member is arranged such that the one side of the intake passage member faces (the right side part of) the internal combustion engine.

In this configuration, the intake passage forming a two-layer structure is provided along and on the side of the internal combustion engine; that is, in a location where the temperature tends to become higher in the engine room. Thus, it is possible to effectively make the in-vehicle device to be less affected by ambient temperature in the upper part of the engine room, which tends to become higher.

In the above engine intake structure, preferably, the upper member is provided with a protruding portion (58, 59) which protrudes upward from an upper surface of the upper member, wherein the protruding portion defines an extension of the resonator chamber.

In this configuration, the extension defined by the protruding portion of the upper member increases the volume of the resonator chamber, which increases degrees of freedom in the design of the resonator formed by the intake passage member.

In the above engine intake structure, preferably, the resonator chamber includes a first resonator chamber (40A) and a second resonator chamber (40B), the second resonator chamber being smaller than the first resonator chamber, wherein the engine intake structure further comprises a first communication passage (38A) in communication with the first resonator chamber; and a second communication passage (38B) in communication with the second resonator chamber, and wherein the first and second communication passages are communicably connected to the intake passage at respective locations which are spaced apart from each other in an axial direction of the intake passage (36X).

This configuration can reduce interference between the resonances caused by the first and second resonator chambers, thereby enhancing the acoustic resonance cancellation effect provided by each resonator chamber.

In the above engine intake structure, preferably, the first and second communication passages are defined by the upper member and the middle member, and the first communication passage includes a portion extending in the axial direction of the intake passage.

In this configuration, the first communication passage can be made longer without increasing the width of the intake passage member, which increases degrees of freedom in the design of the resonator formed by the intake passage member.

Effect of the Invention

The present invention can provide an engine intake structure for vehicles, which enables an in-vehicle device to be less affected by ambient temperature in an engine room.

BRIEF DESCRIPTION OF THE DRAWINGS

FIG. 4 is an exploded perspective view showing an intake passage member shown in FIG. 1;
and
FIG. 5(A) is a diagram showing a top view of a general configuration of an engine intake structure according to an embodiment of the present invention.

FIG. 5(B) is a side view of the engine intake structure seen in FIG. 5(A).

DESCRIPTION OF THE PREFERRED EMBODIMENT(S)

A preferred embodiment of the present invention is described in the following with reference to the appended drawings. As used herein, the right and left are relative to a traveling direction of a vehicle.

Figure 1:
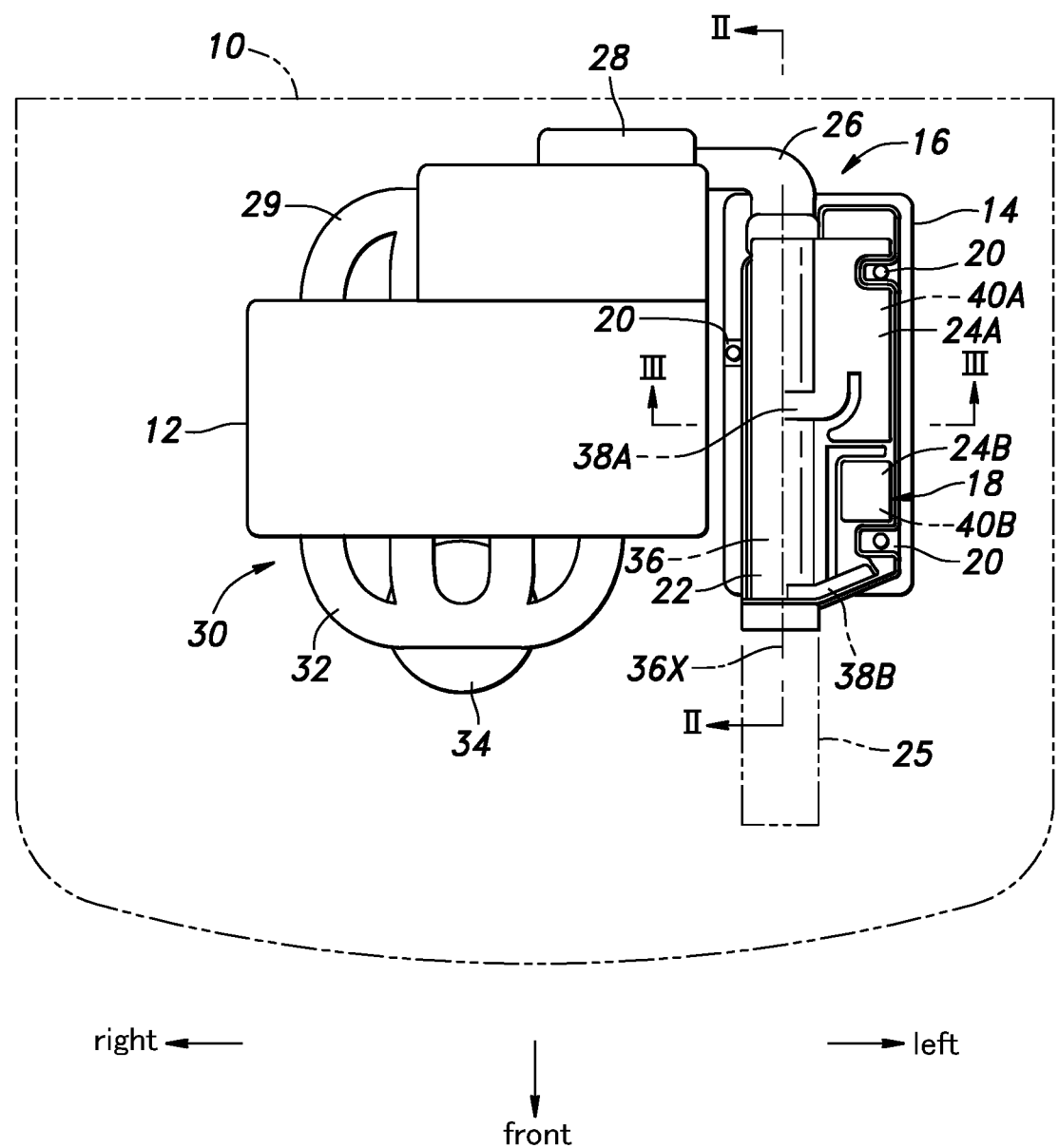
FIG. 1 is a top view of an engine room of a vehicle according to an embodiment of the present invention.

FIG. 1 is a top view of an engine room 10 of a vehicle according to an embodiment of the present invention. The engine room 10 is provided in a front part of a vehicle body of the vehicle and is covered by an engine hood arranged above the engine room. The vehicle is a hybrid vehicle equipped with a driving power source including an engine 12, which is an internal combustion engine, and a motor generator. The motor generator may be located in the engine room 10 or in the vicinity of wheels.

The engine 12 is mounted horizontally in a rear part of the engine room 10. A power control unit (hereinafter referred to as PCU 14), which is an in-vehicle device, is located on the left side of the engine 12. The PCU 14 includes an inverter configured such that, during continuous powered operation, the inverter converts power supplied from a battery from DC to three-phase AC to supply the converted power to the motor generator, and during regeneration operation, the inverter converts power generated by the motor generator from three-phase AC to DC to thereby charge the battery. The inverter operates in response to a request from a control device for controlling the motor generator. The PCU 14 has a substantially rectangular parallelepiped shape, and is fixed to a transmission such that a longitudinal direction of the PCU is parallel with the front-rear direction.

The engine room 10 is provided with an intake system 16 (intake device) for supplying outside air to the engine 12. The intake system 16 includes an intake passage member 18 having a vertically thin flat shape in which a resonator is integrally formed, the intake passage member 18 being located at an intermediate portion in the intake flow direction. The intake passage member 18, which has a substantially rectangular shape as viewed from the above, is located above the PCU 14 so as to cover the upper surface of the PCU 14 with its longitudinal direction that is parallel with the front-rear direction, and is fixed to the PCU 14 via a plurality of support legs 20. The intake passage member 18 includes an intake pipe portion 22 and a resonator portion 24 (24A, 24B). The intake pipe portion 22 extends in the front-rear direction in the right side portion of the intake passage member 18, and the resonator portion 24 (24A, 24B) extends widthwise from the intake pipe portion 22 to the left.

An intake upstream pipe 25 is connected to the front end of the intake pipe portion 22 and extends frontward therefrom. The intake upstream pipe 25 is attached to the vehicle body so as to take in air from its upstream end to the front part of the engine room 10 (a space in front of a radiator for cooling the engine). The intake pipe portion 22 extends in the front-rear direction from the rear end of the intake upstream pipe 25 over the PCU 14 on the left side of the engine 12, and further extending to the rear of the engine 12. The rear portion of the intake pipe portion 22 is curved downward to the rear, and an intake downstream pipe 26 is connected to the rear end of the intake pipe portion 22. From the rear end of the intake pipe portion 22, the intake downstream pipe 26 extends out downward to the rear, and then is curved to the right. The downstream end of the intake downstream pipe 26 is connected to an air cleaner 28 located on the rear side of the engine 12. The downstream portion of the air cleaner 28 is connected to an intake manifold 29 forming a downstream end of the intake system 16, and the intake manifold 29 is fixed to a back surface of the engine 12.

An exhaust manifold 32 forming an upstream end of an exhaust system 30 is fixed to a front surface of the engine 12. The downstream end of the exhaust manifold 32 is connected to the top of an exhaust catalyst 34. An exhaust pipe is connected to the lower and downstream end of the exhaust catalyst 34. The exhaust pipe extends rearward below the engine 12 to a rear part of the vehicle body.

The engine 12 is cooled by an engine cooling device. More specifically, a water jacket is defined in an engine body, the engine body including a cylinder block and a cylinder head of the engine 12. A pair of cooling connection pipes which are in communication with the water jacket, are provided at appropriate locations of the engine body, and form an inlet and an outlet for cooling water, respectively. A pair of engine cooling water pipes which are connected to the cooling connection pipes, are connected to the radiator for cooling the engine. The cooling water circulates in the water jacket and cools the engine 12 by exchanging heat with the engine body. The cooling water that has become hot due to the heat transferred from the engine 12, circulates in the radiator to thereby release heat to outside air. The engine 12 is cooled by the engine cooling device to a temperature that is equal to or lower than a reference temperature for temperature control, where the reference temperature is preset at a control device for controlling the engine cooling device.

The PCU 14, which can become hot due to heat generated by a semiconductor component(s) or other components of the inverter, is cooled by a PCU cooling device. Specifically, a water jacket is defined in a housing of the PCU 14, and a pair of cooling connection pipes in communication with the water jacket are provided at appropriate locations of the housing. The pair of cooling connection pipes form an inlet and an outlet for cooling water. A pair of PCU cooling water pipes which are communicably connected to the cooling connection pipes, are connected to a PCU radiator. The cooling water circulates in the water jacket and cools the PCU 14 by exchanging heat with the housing. The cooling water that has become hot due to heat transferred from the PCU 14, circulates in the PCU radiator to thereby release the heat to outside air. The PCU 14 is cooled by the PCU cooling device to a temperature that is equal to or lower than a PCU reference temperature for temperature control, where the PCU reference temperature is preset at a control device for controlling the PCU cooling device. The PCU reference temperature for the PCU 14 is set to be a lower temperature than that for the engine 12.

Figure 2:
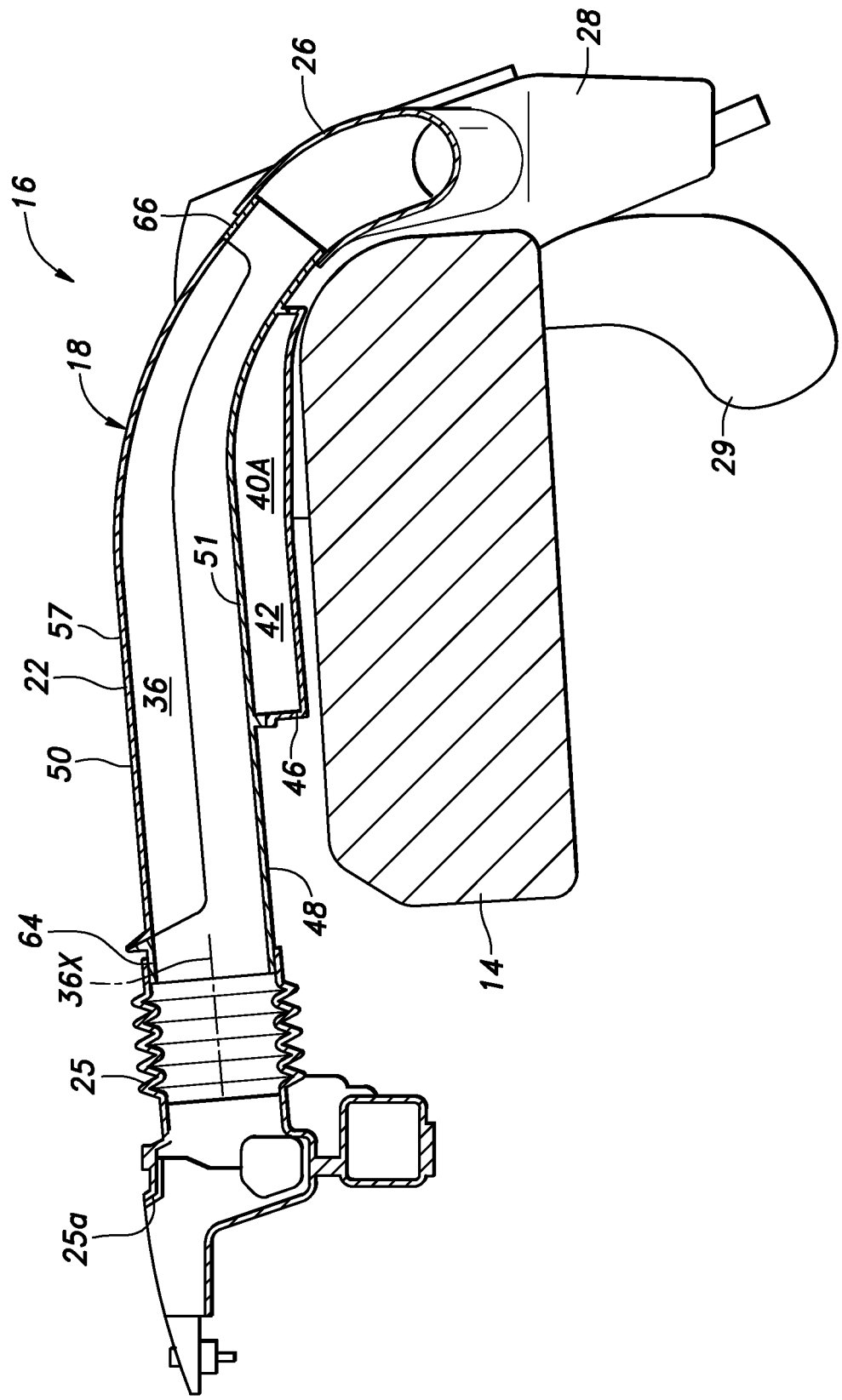
FIG. 2 is a sectional view taken along line II-II of FIG. 1.
Figure 3:
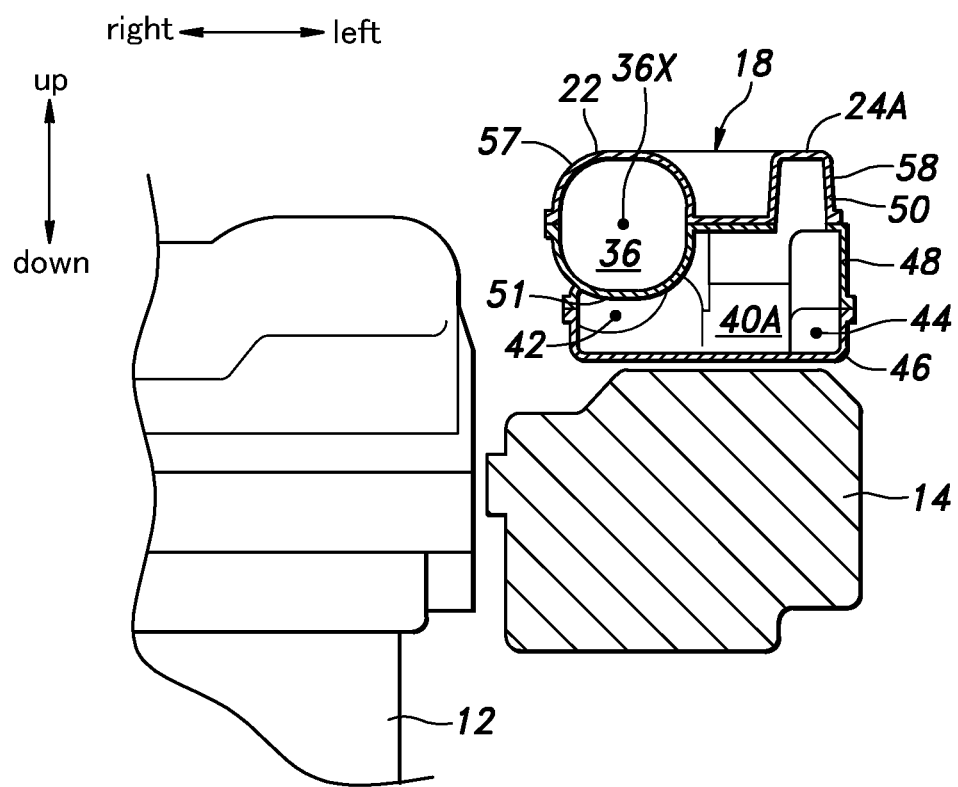
FIG. 3 is a sectional view taken along line of FIG. 1.

FIG. 2 is a sectional view taken along line II-II of FIG. 1. FIG. 3 is a sectional view taken along line of FIG. 1. As shown in FIGS. 1 to 3, the intake pipe portion 22 of the intake passage member 18 defines an intake passage 36 for supplying air taken in from an air intake inlet 25a of the intake upstream pipe 25, to the engine 12. Most of the intake passage 36 extends substantially horizontally in the front-rear direction in the right side portion of the intake passage member 18 laterally to the left side of the engine 12. In other words, an axis 36X of the intake passage 36 extends in the front-rear direction. The rear portion (downstream portion) of the intake passage 36 is inclined downward to the rear. As shown in the cross-sectional view of FIG. 3, the intake passage 36 extends above the PCU 14 so as to overlap a nearly entire width of the PCU 14 (extending across a nearly entire length in the left-right direction of the PCU).

The resonator portion 24 of the intake passage member 18 defines a resonator chamber 40 (40A, 40B) which is in communication with the intake passage 36 via a communication passage 38 (38A, 38B). The resonator portion 24 includes a first resonator portion 24A defining a first resonator chamber 40A at the rear part, and a second resonator portion 24B defining a second resonator chamber 40B at the front part. The first resonator chamber 40A has a volume larger than that of the second resonator chamber 40B. The first resonator chamber 40A is in communication with the intake passage 36 via the first communication passage 38A, and the second resonator chamber 40B is in communication with the intake passage 36 via the second communication passage 38B.

As shown in the cross-sectional view of FIG. 3, the first resonator chamber 40A extends above the PCU 14 so as to overlap a nearly entire width of the PCU 14. Furthermore, the first resonator chamber 40A extends so as to partially circumferentially surround the intake passage 36 from the left side part to the lower side part thereof as viewed in a cross section thereof. In other words, the intake passage 36 extends above the PCU 14 so as to at least partially overlap the first resonator chamber 40A in the vertical direction. Hereinafter, a portion of the first resonator chamber 40A which vertically overlaps the intake passage 36 is referred to as an overlapping portion 42, and a portion(s) of the first resonator chamber 40A which extends out from the left or right side (or both sides) of the intake passage 36 so as not to vertically overlap the intake passage 36 is referred to as a single-layer portion(s) 44.

FIG. 4 is an exploded perspective view showing the intake passage member 18 shown in FIG. 1. As shown in FIGS. 2 to 4, the intake passage member 18 is comprised primarily of a lower member 46, a middle member 48, and an upper member 50 which members are provided so as to vertically overlap one another. In other words, the intake passage member 18 has a three-piece structure consisting primarily of the lower member 46, the middle member 48, and the upper member 50. The lower member 46 is a member provided at the lower end of the intake passage member 18 and adjacent to the upper side of the PCU 14, and the middle member 48 is a member provided between the upper member 50 and the lower member 46. The middle member 48 is coupled to a top of the lower member 46, and the upper member 50 is coupled to a top of the middle member 48. The lower member 46, the middle member 48, and the upper member 50 may be injection-molded products made of a hard plastic material (such as PP (polypropylene)). The lower member 46 and the middle member 48 have respective joining surfaces which are complementary in shape to each other, and are joined to each other by, for example, vibration welding. The middle member 48 and the upper member 50 have respective joining surfaces which are complementary in shape to each other, and are joined to each other by, for example, vibration welding.

The lower member 46 has a substantially flat plate shape and forms a bottom wall of the first resonator chamber 40A and the second resonator chamber 40B.

The middle member 48 includes a first portion 51 which forms an upper wall of the overlapping portion 42 of the first resonator chamber 40A and a bottom wall of the intake passage 36. Moreover, the middle member 48 includes a second portion 52 which forms a side wall of the single-layer portion 44 of the first resonator chamber 40A, a third portion 53 which forms a side wall of a part of the second resonator chamber 40B, and a fourth portion 54 which forms a side wall and an upper wall of a part of the second resonator chamber 40B. In addition, the middle member 48 includes a fifth portion 55 which forms a bottom wall of the first communication passage 38A, and a sixth portion 56 which forms a bottom wall of the second communication passage 38B.

The upper member 50 includes a seventh portion 57 which forms an upper wall of the intake passage 36, an eighth portion 58 which forms a side wall and an upper wall of the single-layer portion 44 of the first resonator chamber 40A, and a ninth portion 59 which forms a side wall and an upper wall of a part of the second resonator chamber 40B.

Moreover, the upper member 50 includes a tenth portion 60 which forms a side wall and an upper wall of the first communication passage 38A, and an eleventh portion 61 which forms a side wall and an upper wall of the second communication passage 38B.

The seventh portion 57 of the upper member 50 is coupled to a top of the first portion 51 of the middle member 48 to form the intake passage 36 having a closed cross-sectional shape. An annular upstream connection portion 64 forming an upstream end of the intake passage 36 is integrally formed at the front end of the first portion 51 of the middle member 48. An annular downstream connecting portion 66 forming a downstream end of the intake passage 36 is integrally formed at the rear end of the first portion 51 of the middle member 48. As a result, the intake upstream pipe 25 and the intake downstream pipe 26 are airtightly connected to the intake pipe portion 22 of the intake passage member 18, while no connections are formed between the middle member 48 and the upper member 50 at the upstream end and the downstream end of the intake passage 36.

The upper surface of the middle member 48 includes an upper plate-shaped portion 68 having a joining surface to be joined to the upper member 50. The fifth portion 55 and the sixth portion 56 of the middle member 48 are formed by the upper plate-shaped portion 68.

The lower surface of the upper member 50 includes a lower plate-shaped portion 70 having a joining surface to be jointed to the middle member 48. The seventh portion 57, the eighth portion 58, the ninth portion 59, the tenth portion 60, and the eleventh portion 61 of the upper member 50 protrude upward from the upper surface of the lower plate-shaped portion 70. The eighth portion 58 protrudes upward from the upper surface of the upper member 50 (the upper surface of the lower plate-shaped portion 70) to define an extension of the first resonator chamber 40A.

The first communication passage 38A formed by the tenth portion 60 is connected to the intake passage 36 at an axially middle portion of the intake passage 36. The first communication passage 38A includes a passage side portion 72 extending to the left from the connection to the intake passage 36, and a resonator side portion 74 extending rearward from the tip of the passage side portion 72 in the front-rear direction in parallel with the axis 36X of the intake passage 36. The rear end of the resonator side portion 74 of the first communication passage 38A is connected to an intermediate portion of the first resonator chamber 40A in the front-rear direction.

The second communication passage 38B formed by the eleventh portion 61 is connected to the intake passage 36 near the axially front end of the intake passage 36. In other words, the first communication passage 38A and the second communication passage 38B are connected to the intake passage 36 at respective locations which are spaced apart from each other in the axial direction of the intake passage 36. The second communication passage 38B extends to the left from the connection to the intake passage 36, and the left side end of the second communication passage 38B is connected to the front end part of the second resonator chamber 40B.

The following description is about how the above-described configuration of an intake structure operates and serves an effect. FIG. 5 is a diagram showing a general configuration of an engine intake structure according to an embodiment of the present invention, and FIGS. 5(A) and 5(B) are a top view and a side view of the engine intake structure, respectively. As shown in FIGS. 3 and 5, the intake passage 36 extends above the PCU 14 so as to at least partially overlap the resonator chamber 40 (accurately, the overlapping portion 42 of the resonator chamber 40) in the vertical direction. Specifically, a two-layer structure is formed by a portion of the intake passage member 18 defining the intake passage 36 and the overlapping portion 42 of the resonator chamber 40 above the PCU 14, which is an in-vehicle device having a preset reference temperature for temperature control as the upper limit temperature. Thus, the in-vehicle device is less affected by ambient temperature in an upper part of the engine room 10, which can become high temperatures. As a result, it is possible to prevent the temperature of the in-vehicle device from increasing beyond the preset reference temperature.

As shown in FIG. 4, the intake passage member 18 forms the bottom wall of the resonator chamber 40, and includes the lower member 46 adjacent to the PCU 14, the middle member 48 coupled to the top of the lower member 46, and the upper member 50 coupled to the top of the middle member 48. In other words, the intake passage member 18 has a three-piece structure consisting primarily of the lower member 46, the middle member 48 and the upper member 50. The middle member 48 includes the first portion 51 forming the upper wall of the resonator chamber 40 and the bottom wall of the intake passage 36, and the upper member 50 includes the seventh portion 57 forming the upper wall of the intake passage 36. As a result, the overlapping portion 42 of the resonator chamber 40 can be easily made to have any desired shape by properly designing the middle member 48 and the lower member 46, which increases degrees of freedom in the design of the resonator. For example, when the resonator chamber 40 formed only by the upper member 50 and the middle member 48 does not have a desired volume, the lower member 46 and the middle member 48 can be properly designed to expand the volume of the resonator chamber 40, without increasing the width of the intake passage member 18.

As shown in FIG. 3, the intake passage 36 extends in and along the right side portion of the intake passage member 18, and the resonator chamber 40 extends adjacent to the intake passage 36 so as to partially circumferentially surround the intake passage 36 from a side part to the bottom part of the intake passage as viewed in a cross section thereof. In other words, the resonator chamber 40 extends over both a side part and the bottom part of the intake passage 36. This enables the volume of the resonator chamber 40 to be easily expanded by increasing one of the width and height of the intake passage member 18.

As shown in FIG. 1, the PCU 14 and the intake passage member 18 are located on the left side of the engine 12 such that the right side portion of the intake passage member 18, in which the intake passage 36 extends, is located close to; that is, faces the engine 12. In other words, the intake passage 36 forming a two-layer structure is provided along and on the side of the engine 12, where the temperature tends to be higher in the engine room 10. This configuration effectively makes the PCU 14 to be less affected by ambient temperature in the upper part of the engine room 10, which can become high.

As shown in FIG. 4, the eighth portion 58 and the ninth portion 59 protrude upward from the upper surface of the upper member 50, and the eighth portion 58 and the ninth portion 59 define the extension of the resonator chamber 40. In other words, the extension defined by the eighth portion 58 and the ninth portion 59 of the upper member 50 can increase the volume of the resonator chamber 40. This configuration increases degrees of freedom in the design of the resonator formed by the intake passage member 18.

As shown in FIGS. 1 and 4, the first communication passage 38A in communication with the first resonator chamber 40A and the second communication passage 38B in communication with the second resonator chamber 40B are connected to the intake passage 36 at the respective locations which are spaced apart from each other in the axial direction of the intake passage 36. This configuration can reduce interference between the resonances caused by the first and second resonator chambers 40A, 40B, thereby enhancing the acoustic resonance cancellation effect provided by each resonator chamber 40.

Furthermore, the first communication passage 38A may include the resonator side portion 74 extending in the axial direction of the intake passage 36. In this configuration, the first communication passage 38A can be made longer without increasing the width of the intake passage member 18, which increases degrees of freedom in the design of the resonator formed by the intake passage member 18.

Specific embodiments of the present invention are described herein for illustrative purposes. However, the present invention is not limited to those specific embodiments, and various modifications may be made. For example, the intake passage member 18 may be located above in-vehicle devices having preset reference temperatures for temperature control which are lower than ambient temperature in the engine room 10, such as control devices for controlling the engine 12 and a motor generator, and other devices such as a transmission or a motor generator. In addition, changes may be made to the specific configuration, arrangement, quantity, angle, material of each member or portion, without departing from the scope of the present invention. Moreover, elements or feature of the above-described embodiments are not always essential, and may be omitted or selected as appropriate.

GLOSSARY 10 engine room
12 engine (internal combustion engine)
14 PCU (in-vehicle device)
16 intake system
18 intake passage member
22 intake pipe portion
24 resonator portion
24A first resonator portion
24B second resonator portion
36 intake passage
36X intake passage axis
38 communication passage
38A first passage
38B second passage
0 resonator chamber
40A first resonator chamber
40B second resonator chamber
42 overlapping portion
44 single-layer portion
46 lower member
48 middle member
50 upper member
51 first portion (portion forming an upper wall of the overlapping portion of the first resonator chamber and a bottom wall of the intake passage)
57 seventh portion (portion forming an upper wall of the intake passage)
58 eighth portion (portion forming a side wall and an upper wall of the single-layer portion of the first resonator chamber)
59 ninth portion (portion forming a side wall and an upper wall of a part of the second resonator chamber)
74 resonator side portion (portion extending in the axial direction of the intake passage)

The invention claimed is:

1. An engine intake structure for vehicles, comprising:
an intake passage member which defines an intake passage for supplying air to an internal combustion engine, and which also defines a resonator chamber in communication with the intake passage; and
an in-vehicle device located in an engine room of a vehicle, the in-vehicle device having a preset reference temperature for temperature control,
wherein the intake passage member is located above and adjacent to the in-vehicle device,
wherein the intake passage extends above the in-vehicle device so as to at least partially overlap the resonator chamber as viewed in a vertical direction,
wherein the intake passage member comprises:
a lower member forming a bottom wall of the resonator chamber and located adjacent to the in-vehicle device;
a middle member including a portion forming an upper wall of the resonator chamber and a bottom wall of the intake passage, the middle member being coupled to a top of the lower member; and
an upper member including a portion forming an upper wall of the intake passage, the upper member being coupled to a top of the middle member,
wherein the resonator chamber includes a first resonator chamber and a second resonator chamber, the second resonator chamber being smaller than the first resonator chamber,
wherein the engine intake structure further comprises a first communication passage in communication with the first resonator chamber; and a second communication passage in communication with the second resonator chamber,
wherein the first and second communication passages are communicably connected to the intake passage at respective locations which are spaced apart from each other in an axial direction of the intake passage, and
wherein the first and second communication passages are defined by the upper member and the middle member and extend along joining surfaces of the upper member and the middle member to each other, and the first communication passage includes a portion extending in the axial direction of the intake passage.

2. The engine intake structure for vehicles according to claim 1, wherein the resonator chamber extends along and partially adjacent to the intake passage so as to partially circumferentially surround the intake passage from a side part to a bottom part of the intake passage as viewed in a cross section thereof.

3. The engine intake structure for vehicles according to claim 2, wherein the in-vehicle device and the intake passage member are located laterally to the internal combustion engine, and
   wherein the intake passage member is arranged such that the one side of the intake passage member faces the internal combustion engine.

4. The engine intake structure for vehicles according to claim 1, wherein the upper member is provided with a protruding portion which protrudes upward from an upper surface of the upper member, wherein the protruding portion defines an extension of the resonator chamber.

* * * * *